US012789827B2

(12) United States Patent
Hansson et al.

(10) Patent No.: US 12,789,827 B2
(45) Date of Patent: Nov. 10, 2026

(54) CONTROL-ENVELOPE BASED VEHICLE MOTION MANAGEMENT

(71) Applicant: VOLVO TRUCK CORPORATION, Gothenburg (SE)

(72) Inventors: Peter Hansson, Grästorp (SE); Leo Laine, Härryda (SE); Ulf Stenbratt, Vallda (SE); José Vilca, Västra Frölunda (SE); Peter Nilsson, Hovås (SE); Adithya Arikere, Gothenburg (SE); Leon Henderson, Härryda (SE); Hans-Martin Heyn, Åsa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 347 days.

(21) Appl. No.: 18/548,597

(22) PCT Filed: Mar. 4, 2021

(86) PCT No.: PCT/EP2021/055448
§ 371 (c)(1),
(2) Date: Sep. 1, 2023

(87) PCT Pub. No.: WO2022/184258
PCT Pub. Date: Sep. 9, 2022

(65) Prior Publication Data
US 2024/0157957 A1 May 16, 2024

(51) Int. Cl.
*B60W 50/12* (2012.01)
*B60W 30/02* (2012.01)
(Continued)

(52) U.S. Cl.
CPC ............ *B60W 50/12* (2013.01); *B60W 30/02* (2013.01); *B60W 50/0097* (2013.01); *G06N 7/01* (2023.01);
(Continued)

(58) Field of Classification Search
CPC .. B60W 50/12; B60W 30/02; B60W 50/0097; B60W 2050/0031;
(Continued)

(56) References Cited

U.S. PATENT DOCUMENTS

| | | | |
|---|---|---|---|
| 9,568,915 | B1 | 2/2017 | Berntorp et al. |
| 2010/0057361 | A1 | 3/2010 | Caveney et al. |

(Continued)

FOREIGN PATENT DOCUMENTS

| | | | |
|---|---|---|---|
| EP | 3580620 | B1 | 9/2023 |
| JP | 2006099715 | A | 4/2006 |

(Continued)

OTHER PUBLICATIONS

European Communication pursuant to Rules 161( 1) and 162 EPC dated Oct. 11, 2023 in corresponding European Patent Application No. 21710427.2, 3 pages.

(Continued)

*Primary Examiner* — Jason Holloway
*Assistant Examiner* — Madison B Emmett
(74) *Attorney, Agent, or Firm* — Jeffri A. Kaminski; Venable LLP

(57) ABSTRACT

A method for controlling motion of a heavy-duty vehicle includes estimating a current vehicle state comprising at least velocity and acceleration, wherein the estimated current state is associated with a current state uncertainty, estimating a future vehicle state based on the current vehicle state, and on a predictive motion model of the vehicle, wherein the future vehicle state is associated with a future vehicle state uncertainty, defining a vehicle control envelope representing an operational limit of the vehicle, wherein the vehicle control envelope defines a range of vehicle states, comparing the estimated future vehicle state, and the associated future vehicle state uncertainty, to the vehicle control (Continued)

envelope, and, if a probability that the future vehicle state breaches the control envelope is above a configured threshold value, limiting a motion capability of the vehicle.

18 Claims, 8 Drawing Sheets

(51) Int. Cl.
*B60W 50/00* (2006.01)
*G06N 7/01* (2023.01)

(52) U.S. Cl.
CPC ............... *B60W 2050/0031* (2013.01); *B60W 2300/125* (2013.01); *B60W 2300/145* (2013.01); *B60W 2520/105* (2013.01); *B60W 2520/14* (2013.01); *B60W 2520/26* (2013.01); *B60W 2556/20* (2020.02)

(58) Field of Classification Search
CPC ..... B60W 2300/125; B60W 2300/145; B60W 2520/105; B60W 2520/14; B60W 2520/26; B60W 2556/20; B60W 10/04; B60W 10/184; B60W 10/20; B60W 2050/0037; B60W 2520/10; B60W 50/087; B60W 2556/25; G06N 7/01
See application file for complete search history.

(56) References Cited

U.S. PATENT DOCUMENTS

2010/0191421 A1* 7/2010 Nilsson .................. B62D 6/003 701/41
2017/0137012 A1* 5/2017 Mao ......................... B60K 6/52
2018/0017971 A1 1/2018 Di Cairano et al.
2020/0033855 A1 1/2020 Jammalamadaka et al.
2020/0117192 A1 4/2020 Satoh et al.
2020/0133281 A1 4/2020 Gomez Gutierrez et al.
2020/0293010 A1 9/2020 Berntorp
2022/0204017 A1* 6/2022 Barton-Sweeney ......................... B60W 40/068

FOREIGN PATENT DOCUMENTS

JP 2011113286 A 6/2011
WO 2020224778 A1 11/2020
WO 2020249239 A1 12/2020
WO 2022184258 A1 9/2022

OTHER PUBLICATIONS

International Search Report and Written Opinion of the International Searching Authority in corresponding International Application No. PCT/EP2021/055448 mailed Nov. 18, 2021 (14 pages).
International Preliminary Report on Patentability in corresponding International Application No. PCT/EP2021/055448 mailed Jun. 1, 2023 (7 pages).
"Tyre and vehicle dynamics", Elsevier Ltd. 2012, ISBN 978-0-08-097016-5, Hans Pacejka, 400 pages.
Chen Chao_Motion planning under perception and control, 7 pages.
Thrun Sebastian_probabilistic robotics_MIT press, 492 pages.
Pratt Roger W_Flight control systems—pracial issues in design and implementation, 407 pages.
Cen Sarah H_precise ego-motion estimation with millimeter-wave radar, 8 pages.
Kiencke Uwe_automotive control system—for engine_driveline and vehicle, 523 pages.
Stellet Jan Erik_Model-based traction control for electric vehicles, 7 pages.

* cited by examiner

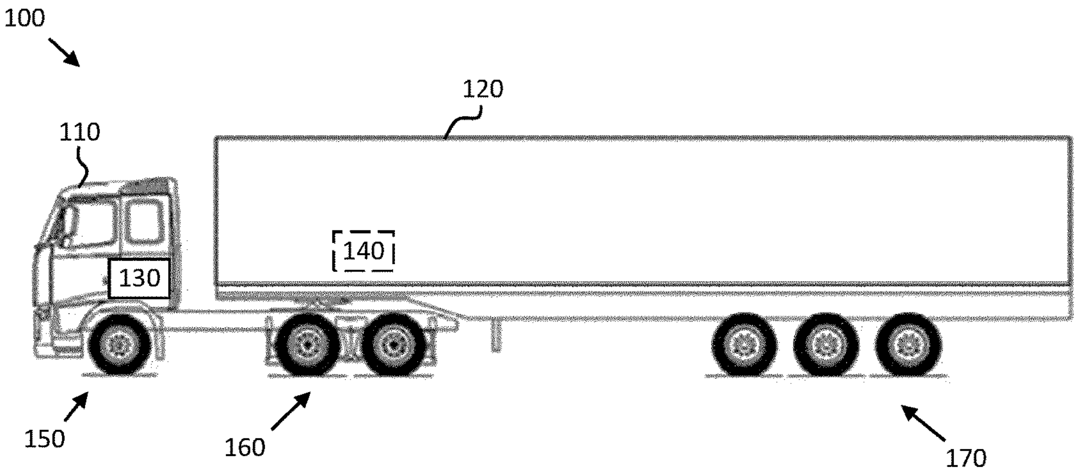
FIG. 1
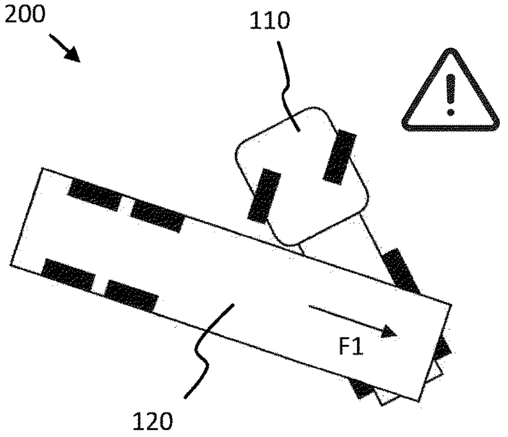
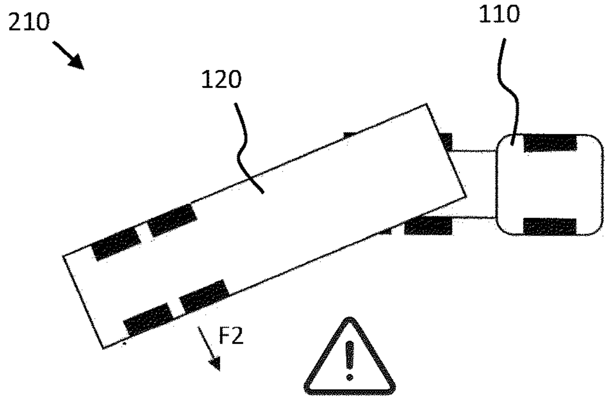
FIG. 2A
FIG. 2B

CONTROL-ENVELOPE BASED VEHICLE MOTION MANAGEMENT

CROSS-REFERENCE TO RELATED APPLICATIONS

This application is a U.S. National Stage application of PCT/EP2021/055448, filed Mar. 4, 2021 and published on Sep. 9, 2022, as WO 2022/184258, all of which is hereby incorporated by reference in its entirety.

TECHNICAL FIELD

The present disclosure relates to methods and control units for ensuring safe and efficient vehicle motion management. The methods are particularly suitable for use with articulated vehicles, such as trucks and semi-trailers comprising a plurality of vehicle units. The invention can, however, also be applied in other types of heavy-duty vehicles, e.g., in construction equipment, mining vehicles, and forestry vehicles.

BACKGROUND

Heavy-duty vehicles, such as trucks and semi-trailer vehicles, must be carefully controlled in hazardous driving scenarios in order to not suffer undesired events such as excessive wheel slip, under-steering, over-steering, vehicle roll-over, jack-knifing and trailer swing events. An inexperienced driver may inadvertently control the vehicle into a state where such events occur, for instance by overreacting if something unexpected happens or by applying the wrong type of control input. An experienced driver, on the other hand, is often capable of performing vehicle control which keeps the vehicle from ending up in a hazardous situation by a more reasoned and tempered control of the vehicle.

Autonomous and semi-autonomous vehicles use various types of sensor input signals for navigation and vehicle control. Advanced driver assistance systems (ADAS) are also based on sensor input signals. Such sensor input signals can be used to improve vehicle safety, for instance by warning the driver about an upcoming hazard. However, these sensor signals may be associated with some uncertainty, i.e., sensor error. Thus, a control unit performing vehicle motion management based on sensor signals always risks basing control decisions on erroneous input data.

There is a need for control methods and devices which reduce the risk of the above-mentioned undesired events.

US 2020/0133281 discloses a safety system of a vehicle and a method for use therein. The disclosed methods use the uncertainty of its predictions of future driving model states to change or update parameters of a driving model. This is performed to enable a safer operation of autonomous vehicles taking into account the higher levels of prediction uncertainty that comes with, e.g. reduced sensor data or poor camera visibility.

JP2006099715A discloses a collision prediction system and method. The collision prediction system and method use an integrated reliability in the determining of the result of the possibility of collision of the vehicle with another vehicle. The integrated reliability is based on the environment and state of the vehicle.

WO2020/224778 also discloses methods for determining is a given vehicle control command can be safely executed.

Still, there is an outstanding need of improved methods for heavy-duty vehicle motion management.

SUMMARY

It is an object of the present disclosure to provide techniques which alleviate or overcome at least some of the above-mentioned problems. This object is at least in part obtained by a method for controlling motion of a heavy-duty vehicle. The method comprises estimating a current vehicle state comprising at least velocity and acceleration, wherein the estimated current state is associated with a current state uncertainty. The method also comprises estimating a future vehicle state based on the current vehicle state, and on a predictive motion model of the vehicle, wherein the future vehicle state is associated with a future vehicle state uncertainty. The method further comprises defining a vehicle control envelope representing an operational limit of the vehicle, wherein the vehicle control envelope defines a range of vehicle states, and comparing the estimated future vehicle state, and the associated future vehicle state uncertainty, to the vehicle control envelope. If a probability that the future vehicle state breaches the control envelope is above a configured threshold value, then the method specifies limiting a motion capability of the vehicle.

One advantage of the above-mentioned features is that the impact of sudden or excessive driver inputs resulting in vehicle motion controls that goes beyond the performance constraints of the vehicle may be reduced, thereby reducing accidents related to this type of driver inputs such as, for example, under/over-steering, skid, jack-knife, or trailer swing.

With a centralized vehicle motion management system comprising vehicle motion estimation, vehicle motion prediction, and vehicle motion control it becomes possible to pro-actively prevent that the vehicle ends up outside the vehicle performance envelope by reducing torque or by applying braking and steering to bring the vehicle state back inside the control envelope. The proposed methods are able to account for uncertainty in sensor data and predictive modelling, which is an advantage. For instance, if the vehicle ends up in a vehicle state from which it is difficult to predict future vehicle states, then a more conservative vehicle control strategy can be chosen.

According to aspects, the vehicle state also comprises any of wheel slip, axle and/or wheel side slip, lateral and/or longitudinal wheel force, and yaw motion. Thus, the herein disclosed methods are versatile and can be used with a number of different vehicle state variables.

According to aspects, the method comprises determining the current state uncertainty based on a measurement uncertainty associated with one or more sensor input signals. It is an advantage that the method is able to account for sensor measurement error and the like, since this improves the robustness in the vehicle motion management.

According to aspects, the method comprises determining the future state uncertainty based on an uncertainty associated with the predictive motion model of the vehicle. Thus, the method is able to account for modelling errors which further improves the robustness of the end result. For instance, the vehicle may end up in a state from which it is difficult to predict future behavior. By accounting for prediction model uncertainty, corrective action can be preemptively taken to reduce this uncertainty.

According to aspects, the method comprises determining the future state uncertainty based on a bounded behavior associated with one or more motion support devices (MSD). The MSDs, or at least some of the MSDs on the vehicle, can operate according to a contract, where, e.g., linear behavior is guaranteed. This makes it easier to predict vehicle behavior, since non-linear behaviors can be disregarded in the models. For instance, by enforcing a wheel slip limit on the wheels of a vehicle, a linear tyre force vs wheel slip behavior can be guaranteed.

According to aspects, the vehicle is an articulated vehicle comprising a plurality of vehicle units, where the method further comprises estimating the respective future vehicle state separately for each vehicle unit in the plurality of vehicle units. This means that some vehicle unit may be deemed as risking entering into a hazardous state while other vehicle units are not in risk of entering into hazardous states. This increases the control freedom of operation of a vehicle motion management function. For instance, the vehicle motion management function may apply braking by one of the more stable vehicle units to bring the vehicle combination back within the control envelope.

According to aspects, the method comprises performing a corrective action by the vehicle in response to the probability that the future vehicle state breaching the control envelope being above a configured threshold value, wherein the corrective action comprises reducing a desired global force communicated to an MSD coordination module.

According to aspects, the method also comprises controlling the vehicle by requesting wheel slip values and/or wheel speed values from one or more MSDs of the vehicle. The interface between the vehicle motion controller and MSDs capable of delivering torque to the vehicle's wheels has, traditionally, been focused on torque-based requests to each MSD from the controller without any consideration towards wheel slip. However, this approach may be associated with some performance limitations related to control latency. Significant benefits can be achieved by instead using a wheel speed or wheel slip based request on the interface between main vehicle controller and the MSD controller or controllers, thereby shifting the difficult actuator speed control loop to the MSD controllers, which generally operate with a much shorter sample time compared to that of the main vehicle controller function. Such an architecture can provide much better disturbance rejection compared to a torque-based control interface and thus improves the predictability of the forces generated at the tyre road contact patch.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 1 schematically illustrates a vehicle for cargo transport;

FIG. 2A shows an undesired jack-knife event;

FIG. 2B shows an undesired trailer swing event;

DETAILED DESCRIPTION OF EXAMPLE EMBODIMENTS OF THE INVENTION

Figure 2C:
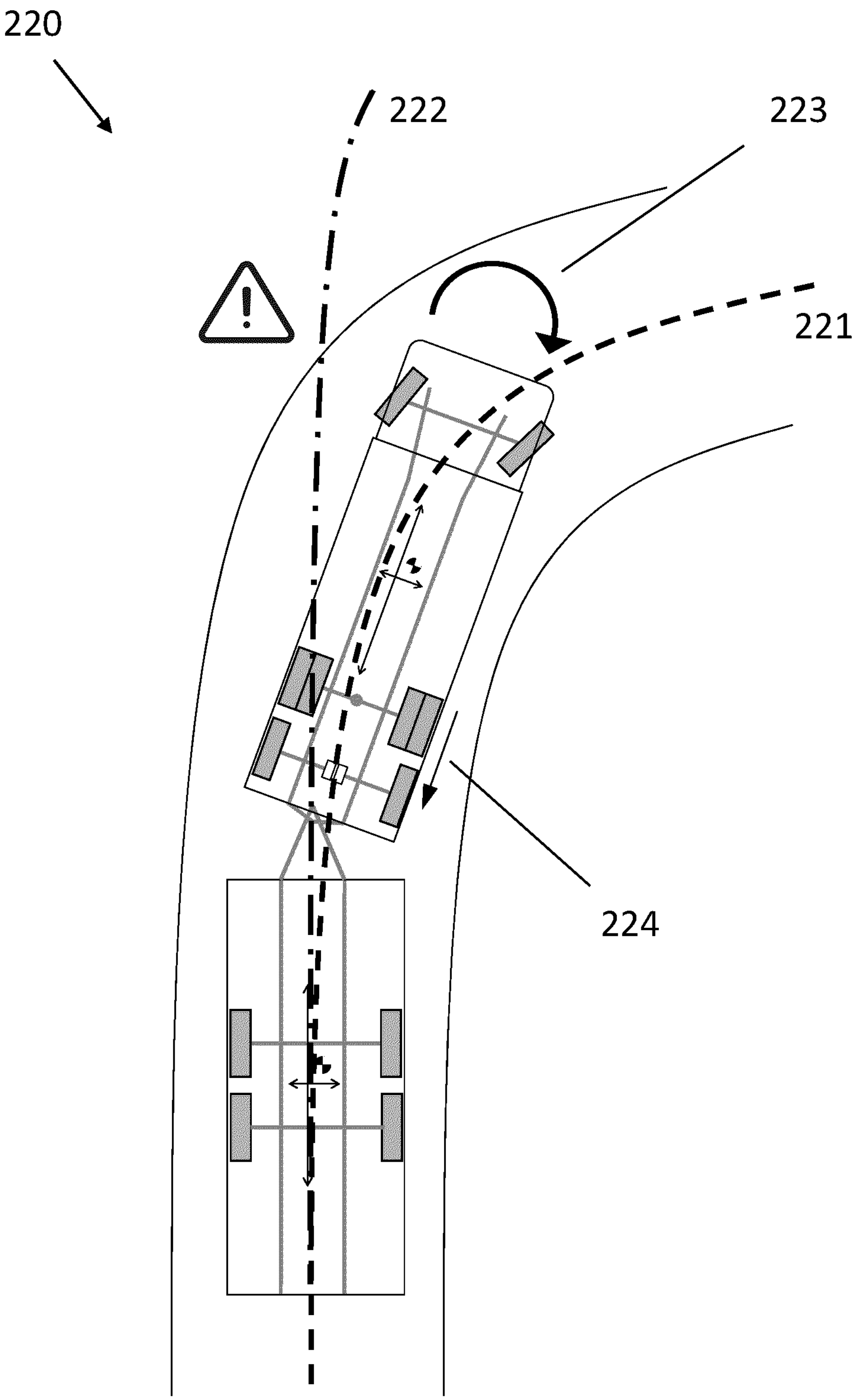
FIG. 2C illustrates a vehicle under-steering event.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Flight envelope protection is a human machine interface extension of an aircraft's control system that prevents the pilot of an aircraft from issuing control commands that would force the aircraft to exceed its structural and aerodynamic operating limits. It is used in most modern commercial fly-by-wire aircraft. The advantage of flight envelope protection systems is that they restrict a pilot's excessive control inputs, whether in surprise reaction to emergencies or otherwise, from translating into excessive flight control movements.

Notionally, this allows pilots to react quickly to an emergency while blunting the effect of an excessive control input resulting from "startle," by electronically limiting excessive control surface movements that could over-stress the airframe and endanger the safety of the aircraft.

The present disclose relates to applying a similar control limitation approach to the control of heavy-duty vehicles, either by a driver or by some form of autonomous or semi-autonomous control system. However, the flight envelope protection methods from avionics cannot just be applied as-is onto the control of a heavy-duty vehicle. A number of key adaptations are necessary, which will be described in detail in the following.

A heavy-duty vehicle comprising a control envelope based vehicle motion management system according to the present disclosure will limit the controls by a driver to blunt rapid excessive responses by the vehicle, thereby avoiding that the vehicle ends up in a vehicle state which is outside of the operational limits of the vehicle. Thus, undesirable events such as vehicle under-steering and over-steering, vehicle roll-over, jack-knifing, excessive trailer swing, and similar undesirable events can be avoided, while allowing the driver to react quickly to unexpected events as they happen.

In an aircraft the fluid dynamics around the wings and control surfaces has a certain angle of attack for generating lift force, beyond this angle of attack the plane risks goes into stalling which is an undesired event. This type of event can be predicted by a model of the aircraft and a control system can be arranged to give guidance to the pilot, enabling the pilot to avoid the stalling situation. In a similar manner, a commercial heavy-duty vehicle combination can be safely controlled within a predicted control envelope by using a predictive model of vehicle motion arranged to predict, i.e., foresee, undesired vehicle states, e.g., a roll-over situation or severe understeering event.

The techniques disclosed herein rely on that the vehicle comprises a vehicle motion management (VMM) function which continuously performs motion estimation and also motion prediction. Motion prediction means that the vehicle continuously predicts the future vehicle state some 0.5-1.5 s forward in time. This future vehicle state is periodically compared to a vehicle control envelope which represents an operational limit of the vehicle. If the controller deems that the risk of ending up outside of the control envelope is too high, some form of corrective action will be taken. This corrective action may, e.g., be a reduction of reported capability to some higher layer control algorithm. The reported capability may be a capability for an entire vehicle unit, such as a tractor or trailer, or for parts of a vehicle unit, such as an axle or even a single wheel. A capability may, e.g., be a maximum acceleration or velocity, a side slip, or the like. Thus, if the motion estimation function on the vehicle realizes that the vehicle is on its way to enter the hazardous state, the motion coordination will bring it back to a safe state by, e.g., reducing torque or braking and steering.

The motion estimation in the VMM can include a probabilistic part that captures the fact that there is significant uncertainty in making predictions into the future, both due to uncertainty in current vehicle state estimates and in the predictive vehicle model used to make the predictions of future vehicle state. For instance, it may be difficult to accurately model roll transfer of a heavy vehicle combination. By detecting when the vehicle enters into a range of states where state modelling is difficult, a higher level of uncertainty can be assigned. Using such a model results in predictions that are probability distributions instead of fixed values. These distributions can then be used to make decisions on how and when to restrict the vehicle capability to achieve a suitable blend of safety (early intervention) and driver comfort (few false interventions).

Model errors can also be introduced if the vehicle encounters unexpected changes in ambient environment, like driving over potholes. By adding prediction uncertainty to the vehicle motion control, it becomes possible to limit, e.g., vehicle speed in cases where vehicle motion prediction and vehicle motion sensor input differ.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels. Normally but not necessarily, all the wheels on the tractor are braked wheels. The tractor 110 is configured to tow a first trailer unit 120 supported on trailer wheels 170 by a fifth wheel connection in a known manner. The trailer wheels are normally braked wheels but may also comprise driven wheels on one or more axles.

It is appreciated that the herein disclosed methods and control units can be applied with advantage also in other types of heavy-duty vehicles, such as trucks with drawbar connections, multi-trailer vehicles comprising one or more dolly vehicles, construction equipment, buses, and the like.

The tractor 110 comprises a vehicle unit computer (VUC) 130 for controlling various kinds of functionality, i.a. to achieve propulsion, braking, and steering. Some trailer units 120 also comprise a VUC 140 for controlling various functions of the trailer, such as braking of trailer wheels, active suspension, and sometimes also trailer wheel propulsion. The VUCs 130, 140 may be centralized or distributed over several processing circuits. Parts of the vehicle control functions may also be executed remotely, e.g., on a remote server connected to the vehicle 100 via wireless link and a wireless access network.

The VUC 130 on the tractor 110 (and possibly also the VUC 140 on the trailer 120) may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer.

FIGS. 2A-2D illustrate some example undesired events which the herein proposed methods aim to mitigate by predictive vehicle motion management.

FIG. 2A illustrates a jack-knifing event 200. This type of event may occur if the driver overreacts by inappropriate steering. The force F1 pushes the trailer in a direction to fold the combination vehicle in an undesired way.

FIG. 2B shows an example of excessive trailer swing 210. In case the driver does not handle the vehicle 100 correctly, a large lateral force F2 may be generated at the trailer 120 which causes the trailer to swing out.

FIG. 2C illustrates a driving scenario 220 where understeering occurs. To negotiate the curve shown in FIG. 2C successfully, the vehicle combination should follow the desired path 221 (dashed line), however, the vehicle instead follows another path 222 (dash-dotted line), i.e., understeers. This understeering may be due to, e.g., reduced road surface friction. Understeering may lead to significant risks for driver injury and vehicle damage. For instance, if it is desired to turn right in a crossing, but the vehicle enters the crossing at too high speed and too late applies vehicle brakes, then the vehicle will experience wheel slip and a reduced ability to generate lateral steering force. This situation can be avoided if the vehicle velocity is decreased as it enters into the crossing area. To improve the situation, a correcting yaw torque 223 can also be applied. This correcting yaw torque can be generated, e.g., by applying braking 224 at the right rear wheels of the tractor vehicle unit. By the herein proposed methods, the VUC estimates vehicle state based on sensor input, and predicts future vehicle states using a predictive vehicle motion model. If the vehicle risks ending up in a hazardous state, then the vehicle motion control takes corrective action, either by limiting the control input from the driver or more actively by triggering actuation by some motion support device, such as the applied braking in FIG. 2C.

Figure 2D:
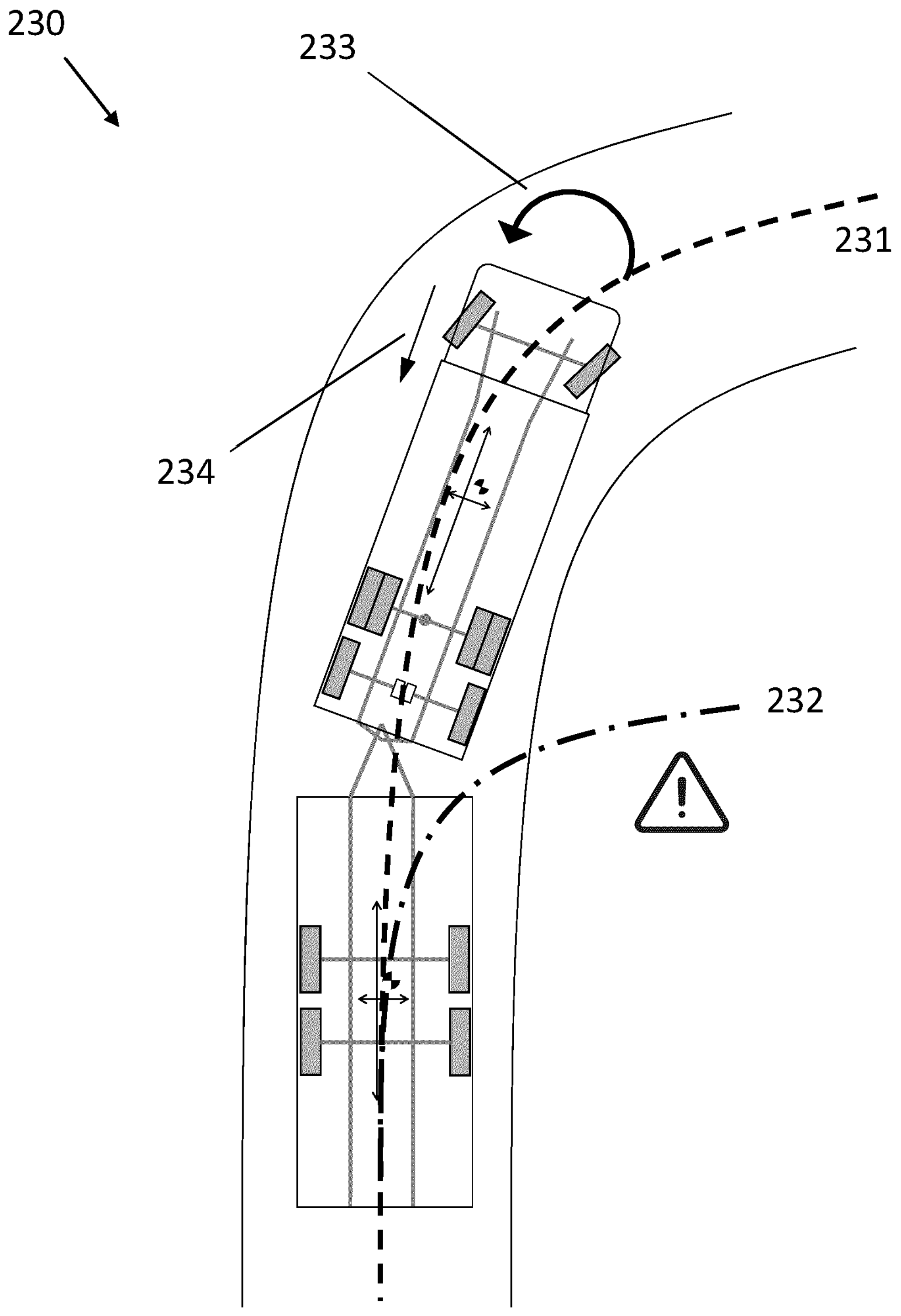
FIG. 2D illustrates a vehicle over-steering event.

FIG. 2D illustrates a driving scenario 230 where an over-steering event 230 occurs. It is desired to follow the dashed line path 231, but for some reason the trailer vehicle unit oversteers and follows the dash-dotted line 232. A corrective yaw motion 233 is desired to avoid this situation. This corrective yaw motion can be generated, e.g., by applying braking 234 on the left front wheels of the vehicle. As for the event 220 in FIG. 2C, the herein proposed methods are able to predict that the vehicle risks ending up in an over-steering scenario, and is able to take corrective actions to avoid the undesired event and/or to mitigate the consequences of the hazardous vehicle state.

Figure 3:
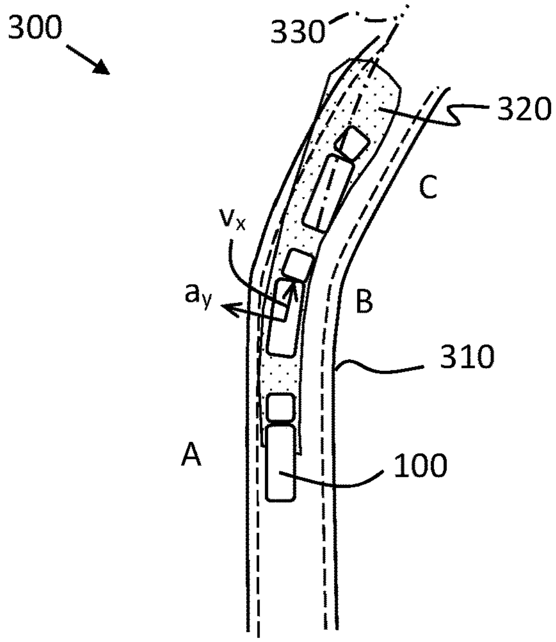
FIG. 3 schematically illustrates vehicle motion estimation and motion prediction.

FIG. 3 illustrates another example scenario 300 comprising the vehicle 100 driving along a road 310. The vehicle comprises one or more sensors which are used by the VUCs 130, 140 to estimate current vehicle state. The current vehicle state comprises variables such as velocity vector [$v_x$, $v_y$], acceleration vector [$a_x$, $a_y$], as well as yaw moment and so on.

At point A, the vehicle 100 is about to enter into a curve having a curvature. The VUCs 130, 140 estimate a current vehicle state at this point in time. In addition to the current vehicle state, the VUCs also predict a future vehicle state, i.e., a vehicle state which the vehicle is believed to have at some future point in time, such as the points in time when the vehicle is at point B an at point C. Such prediction is possible by using a predictive motion model, of which examples will be discussed below.

Of course, this prediction of the future vehicle state will not be perfect but associated with some error. For instance, sensor input signals are not likely to be error free, and the motion prediction is also likely to be associated with an error. In addition, it is of course impossible to exactly predict the control inputs from a driver before they occur. This prediction error, or vehicle state prediction uncertainty, is illustrated in FIG. 3 by the growing area 320. It is understood that uncertainty in general increases the further ahead in time the prediction is made.

The vehicle 100 is associated with a vehicle control envelope which represents an operational limit of the vehicle. This vehicle control envelope defines a range of vehicle states deemed safe. As long as the vehicle 100 has a state within the control envelope, the motion by the vehicle is predictable (often linear), and not associated with a hazardous situation. However, if the vehicle 100 breaches the control envelope, undesired behavior can be expected. For instance, wheel forces may start to exhibit non-linear behavior in the dependence of wheel slip or applied torque.

For example, the situation 300 in FIG. 3 may be associated with an understeering event, where the predictive motion model indicates a likelihood of the vehicle 100 following the dash-dotted path 330. The methods presented herein will then act preventively to correct vehicle motion such that the understeering event does not occur. For instance, a corrective yaw motion as discussed above in connection to FIG. 2C may be generated by the vehicle motion management system. As another example, a risk of roll-over may be associated with increased risk in the situation 300 in FIG. 3. The methods discussed herein will then interfere to bring the vehicle back within the control envelope in a predictive manner.

Figure 4:
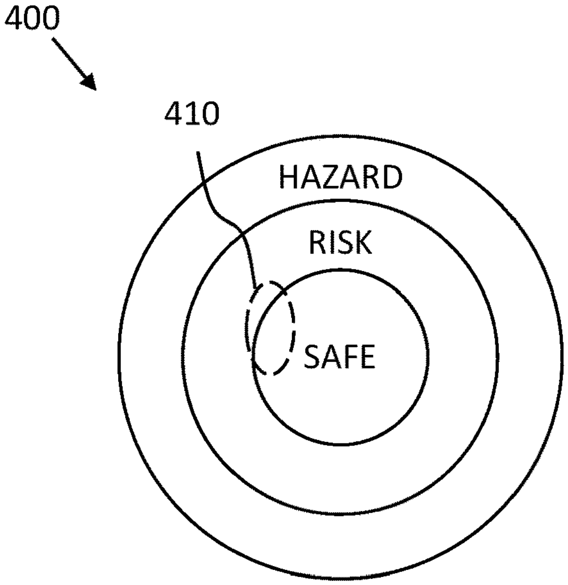
FIG. 4 shows an example vehicle control envelope.

A schematic illustration of an example control envelope 400 is shown in FIG. 4. Here, an uncertainty ellipse 410 derived from the probability of the error distribution associated with the predicted future vehicle state uncertainty 320 is compared to the control envelope. If a sufficiently large part of this uncertainty ellipse extends beyond the control envelope, unsafe and/or unpredictable operation of the vehicle ensues and undesired vehicle events like those in FIGS. 2A-D may occur.

Figure 5:
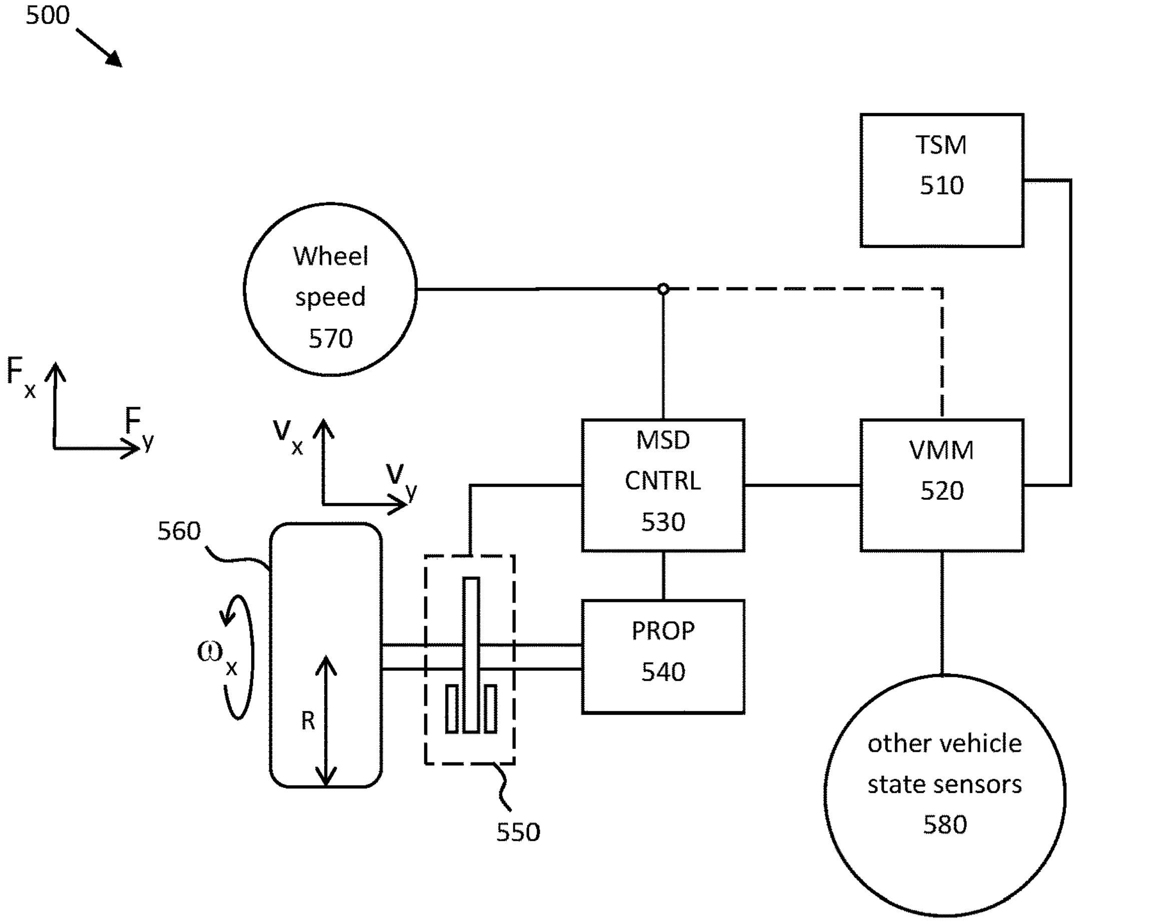
FIG. 5 illustrates an example vehicle motion support device (MSD) control system.

FIG. 5 schematically illustrates functionality 500 for controlling a wheel 560 by some example MSDs here comprising a friction brake 550 (such as a disc brake or a drum brake) and a propulsion device 540 (such as an electric machine). The friction brake 560 and the propulsion device 540 are examples of wheel torque generating devices, which may also be referred to as actuators and which can be controlled by one or more motion support device control units 530. The control is based on, e.g., measurement data obtained from a wheel speed sensor 570 and from other vehicle state sensors 580, such as radar sensors, lidar sensors, and also vision based sensors such as camera sensors and infra-red detectors. Other example torque generating motion support devices which may be controlled according to the principles discussed herein comprise engine retarders and power steering devices. An MSD control unit 530 may be arranged to control one or more actuators. For instance, it is not uncommon that an MSD control unit 530 is arranged to control MSDs for both wheels of an axle.

Some of the techniques disclosed herein involve placing requirements on brake systems and/or propulsion devices such as electrical motors in order to facilitate such a system. The present disclosure is at least partly based on the observation that, at any point in time, there is a connection between the maximal achievable lateral force $F_y$ and the maximal longitudinal force $F_x$ that a vehicle can achieve on, e.g., a tyre. This means that if a too high longitudinal brake force is applied, the lateral steering capability of the vehicle is lost (and the vehicle state has breached the control envelope). From a model perspective, this implies that there will be large uncertainties in the lateral dynamics of the vehicle if unrestricted braking is allowed. The large uncertainties lead to a conservative analysis of the performance of an emergency maneuver and thus a significantly reduced operational design domain (ODD). The present disclosure aims to overcome this drawback by imposing limits on, e.g., allowable wheel slip on wheel torque devices, such as brakes and propulsion arrangements.

Figure 6:
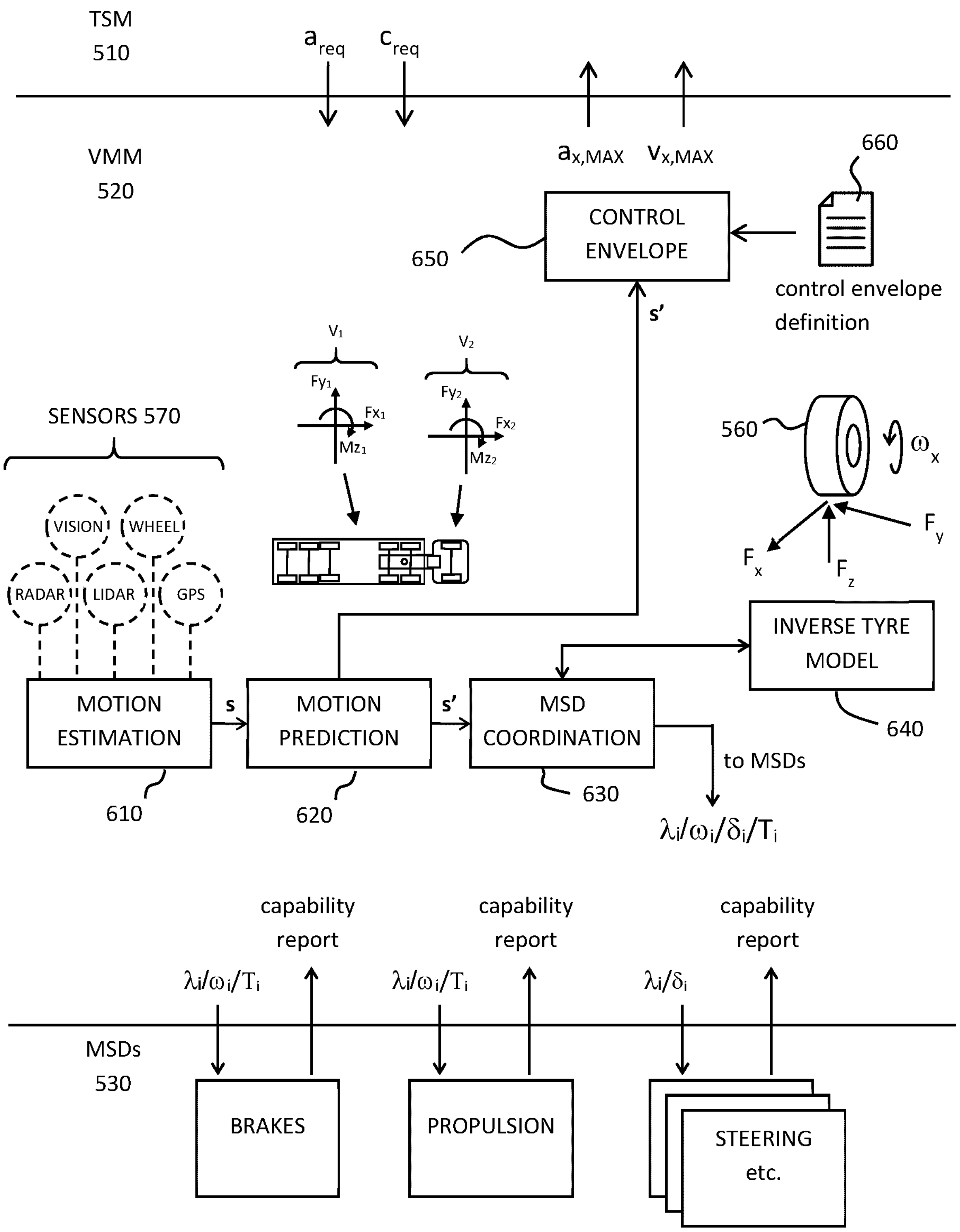
FIG. 6 shows components of a layered vehicle control system.

With reference also to FIG. 6, the TSM function 510 plans driving operation with a time horizon of, e.g., 1-10 seconds or so. This time frame corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 520 which performs force allocation to meet the requests from the TSM in a safe and robust manner. The VMM function 520 continuously feeds back capability information (here exemplified by maximum velocity and acceleration vectors $a_{x,MAX}$ and $v_{x,MAX}$) to the TSM function detailing the current capability of the vehicle in terms of, e.g., forces, maximum velocities, and accelerations which can be generated.

Acceleration profiles and curvature profiles may also be obtained from a driver of the heavy-duty vehicle via normal control input devices such as a steering wheel, accelerator pedal and brake pedal. The source of said acceleration profiles and curvature profiles is not within scope of the present disclosure and will therefore not be discussed in more detail herein.

The VMM function 520 operates with a time horizon of about 0.1-1.5 seconds or so, and continuously transforms the acceleration profiles $a_{req}$ and curvature profiles $c_{req}$ into control commands for controlling vehicle motion functions, actuated by the different MSDs 530 of the vehicle 100 which report back capabilities to the VMM, which in turn are used as constraints in the vehicle control. The VMM function 520 performs vehicle state or motion estimation 610, i.e., the VMM function 520 continuously determines a vehicle state s (often a vector variable) comprising positions, speeds, accelerations, yaw motions, and articulation angles of the different units in the vehicle combination by monitoring operations using various sensors 570 arranged on the vehicle 100, often but not always in connection to the MSDs 530.

The result of the motion estimation 610, i.e., the estimated vehicle state s, is input to a motion prediction module 620 which bases a predictive future motion state s' by the vehicle on the current vehicle state s.

An MSD coordination function 630 determines required global forces for the different vehicle units to cause the vehicle 100 to move according to the requested acceleration and curvature profiles $a_{req}$, $c_{req}$ and allocates wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

By determining vehicle unit motion using, e.g., global positioning systems, vision-based sensors, wheel speed sensors, radar sensors and/or lidar sensors, and translating this vehicle unit motion into a local coordinate system of a given wheel 560 (in terms of, e.g., longitudinal and lateral velocity components), it becomes possible to accurately estimate wheel slip in real time by comparing the vehicle unit motion in the wheel reference coordinate system to data obtained from the wheel speed sensor 570 arranged in connection to the wheel 560. An inverse tyre model 640 can be used to translate between a desired longitudinal tyre force $Fx_i$ for a given wheel i and an equivalent wheel slip $\lambda_i$ for the wheel. Wheel slip λ relates to a difference between wheel rotational velocity and speed over ground and will be discussed in more detail below. Wheel speed ω is a rotational speed of the wheel, given in units of, e.g., rotations per minute (rpm) or angular velocity in terms radians/second (rad/sec) or degrees/second (deg/sec).

Herein, a tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

Longitudinal wheel slip λ may, in accordance with SAE J670 (SAE Vehicle Dynamics Standards Committee Jan. 24, 2008) be defined as $$\lambda = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, λ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

Figure 8A:
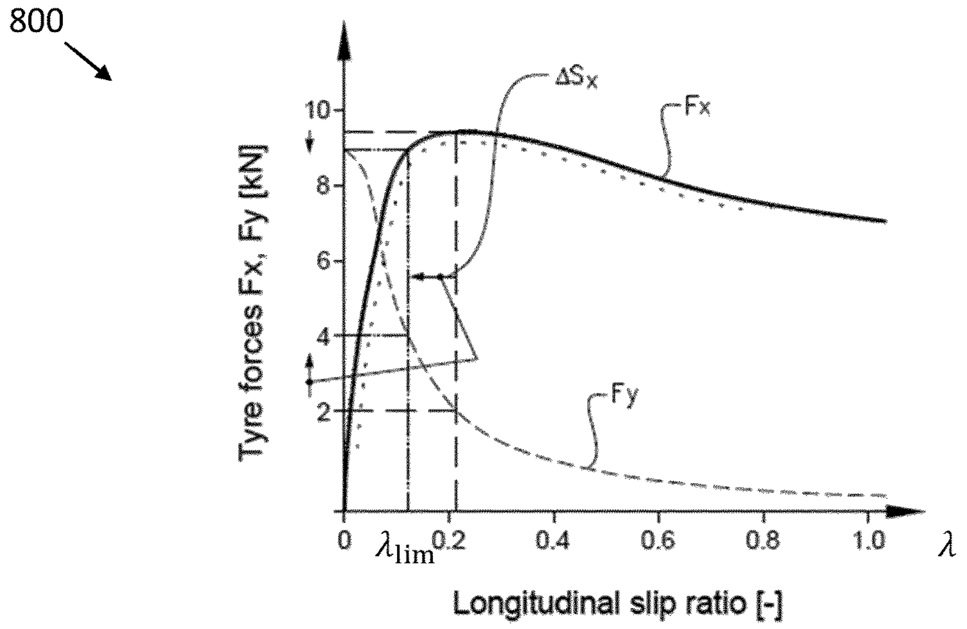
FIGS. 8A-C illustrate linearized tyre modelling.
Figure 8B:
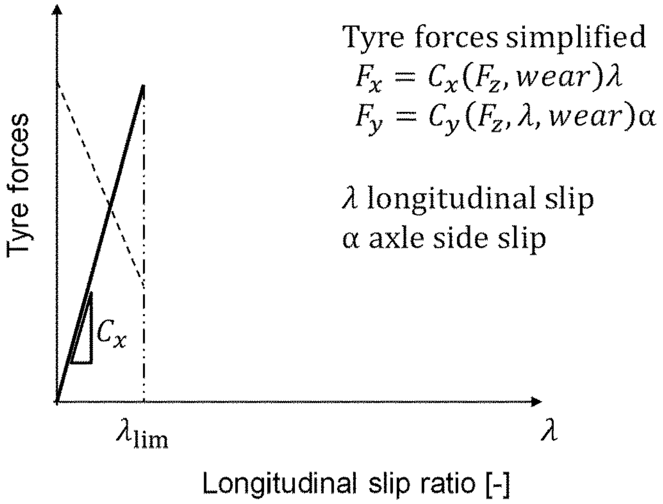
Figure 8C:
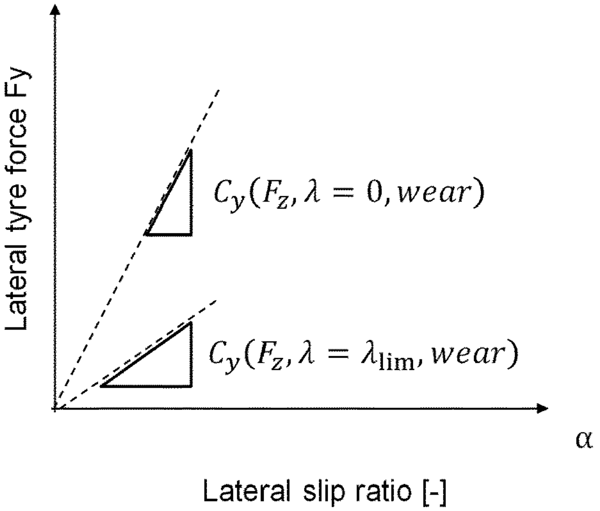

With reference to FIGS. 8A-C. in order for a wheel (or tyre) to produce a wheel force, slip must occur. For smaller slip values the relationship between slip and generated force are approximately linear, where the proportionality constant is often denoted as the slip stiffness C of the tyre. A tyre 560 is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force $F_x$ by the wheel since, normally, $F_x \leq \mu F_z$, where μ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

As long as the wheel slip λ is kept below a wheel slip limit $\lambda_{lim}$, the relationships between force and slip are approximately linear, as illustrated in FIGS. 8B and 8C, where $C_x$ is a longitudinal slip stiffness, where $C_y$ is a lateral slip stiffness. The stiffness coefficients can be approximated by functions of normal force $F_z$, tyre wear, and the slip (for lateral slip).

To summarize, the VMM function 520 manages both force generation and MSD coordination, i.e., it determines what forces that are required at the vehicle units in order to fulfil the requests from the TSM function 510, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

The interface between VMM and MSDs capable of delivering torque to the vehicle's wheels has, traditionally, been focused on torque-based requests to each MSD from the VMM without any consideration towards wheel slip. However, this approach may be associated with some performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Significant benefits can be achieved by instead using a wheel speed or wheel slip based request on the interface between VMM and the MSD controller or controllers, thereby shifting the difficult actuator speed control loop to the MSD controllers, which generally operate with a much shorter sample time compared to that of the VMM function. Such an architecture can provide much better disturbance rejection compared to a torque-based control interface and thus improves the predictability of the forces generated at the tyre road contact patch.

With renewed reference to FIG. 6, the inverse tyre model block 640 translates the required wheel forces $Fx_i$, $Fy_i$ determined for each wheel, or for a subset of wheels, by the MSD coordination block into equivalent wheel speeds $\omega_{wi}$ or wheel slips $\lambda_i$. These wheel speeds or slips are then sent to the respective MSD controllers 530. The MSD controllers report back capabilities which can be used as constraints in, e.g., the MSD coordination block 630. Note that torque requests $T_i$ may also be issued to some or all torque generating MSDs.

The control system in FIG. 6 also comprises a control envelope module 650. This envelope control module is arranged to compare the predicted vehicle state s' from the motion prediction module 620 to a configured definition 660 of a control envelope. In case the predicted vehicle state breaches this control envelope, the control envelope module 650 limits the capability of the vehicle 100 as reported from the VMM layer 520 to the TSM layer 510. This means that a driver of the vehicle may turn the wheel abruptly, perhaps in response to some unexpected event which startles the driver. However, this large steering wheel input will propagate through the system schematically illustrated in FIG. 6, result in a predicted breach of the control envelope by the control envelope module 650, and a resulting limitation of vehicle capability. This decreased vehicle capability means that any of propulsion torque, braking torque, or steering angle is limited or even reduced in order to avoid ending up outside of the operational domain of the vehicle. Thus, a too strong reaction by a driver will be limited to keep the vehicle motion within the predictable domain where vehicle motion management can be performed.

Note that the control signals to the different MSDs may be either wheel slip $\lambda_i$, wheel speed $\omega_i$, or applied torque $T_i$. The steering commands may comprise steered angle $\delta_i$.

Figure 7A:
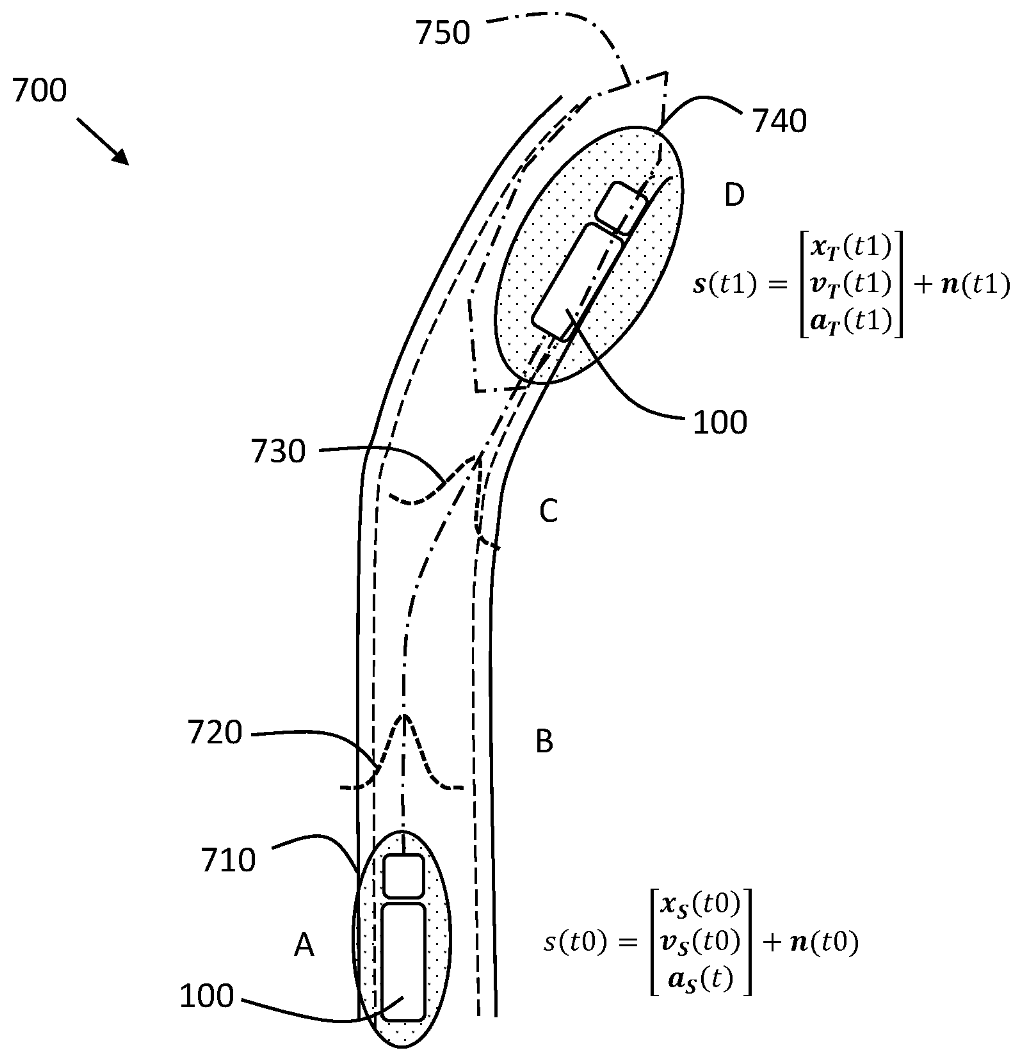
FIGS. 7A-B schematically illustrate motion prediction uncertainty.

FIG. 7A illustrates a driving scenario comprising estimating an uncertainty of the predicted vehicle state s'. The vehicle 100 is at current time t0 in position A, where sensor signals are used to estimate a current vehicle state s(t0). This state s here comprises position x, vehicle speed v, and acceleration a, all two-dimensional vectors. The uncertainty is modelled as a multi-dimensional Gaussian random variable n(t0), associated with a mean and a covariance. The general uncertainty in current vehicle state is illustrated by the uncertainty ellipse 710. This is just for illustrative purposes, since it is appreciated that this uncertainty will have more than two dimensions.

At point B, the vehicle 100 obtains more sensor data 720. This sensor data is of course also associated with an uncertainty, or error distribution. This sensor error has an effect on the current estimation of vehicle state. Further sensor data 730 is obtained at point C.

The vehicle continuously predicts a future vehicle state. For instance, when the vehicle is at point C, the vehicle state at time t1 (corresponding to point D) can be predicted. This estimated future vehicle state is associated with a future state uncertainty 740, which of coursed increases with prediction model error, errors in the estimated current state, and also errors in assumed control input by the driver or by the vehicle control system.

The configured vehicle control envelope is illustrated schematically by the dash-dotted line 750. In case the uncertainty ellipse 750 goes too far outside of this control envelope, then an action is triggered by one or both VUCs 130, 140.

The future state uncertainty can, for instance, be obtained from extrapolation by a Kalman filter or similar minimum mean-squared error (MMSE) filter The covariance matrix estimate $P_{k|k}$ in a Kalman filter algorithm at sample k (or, equivalently, at discrete time index k) given data input up to time k is determined as $P_{k|k}=(I-K_kH_k)P_{k|k-1}(I-K_kH_k)^T+K_kR_kK_k^T$, where $P_{k|k-1}=F_kP_{k-1|k-1}F_k^T+Q_k$, and where $P_{k|k-1}$ is the covariance matrix estimate at time k given data up to time k−1, I is the identity matrix, $K_k$ is the Kalman gain at time step k, $H_k$ is the observation matrix at time step k, $R_k$ is the assumed covariance matrix of the measurement noise, i.e., describing the uncertainty in the input sensor signals, $F_k$ is a state transition matrix at time step k, and $Q_k$ is a process noise at time step k.

Note that the relationship $$P_{k|k-1} = F_k P_{k-1|k-1} F_k^T + Q_k$$

can be used to predict uncertainty n time steps from time k by iteratively performing the matrix operations n times, giving $P_{k+n|k-1}$. Extrapolation by use of a Kalman filter is known and will therefore not be discussed in more detail herein.

Note also that the estimate of covariance matrix $P_{k|k}$ does not depend on the actual realization of sensor data, only on the assumed statistics of the error distributions and processes. Thus, the uncertainty ellipsoids 740 can be determined by simply iterating the above equations.

A sequence of uncertainty ellipsoids in FIG. 7A can determined starting in an initial vehicle state s(t0) with associated uncertainty ellipsoid 710 determined from $P_{0|0}$ at location (A) up to and end location (D) of the planned track associated with a vehicle state and associated uncertainty ellipsoid 740.

The probability of a vehicle state realization outside of the vehicle control envelope may be evaluated using the Q-function. For a single variable $$Q(x) = \frac{1}{\sqrt{2\pi}} \int_x^{\infty} \exp\left(-\frac{u^2}{2}\right) du$$

For a vector state variable, the multidimensional Q-function must be used. Approximations can be used to evaluate the Q-function in order to make the computation more efficient. A number of different approximations to the Q-function are known, see, e.g., Abramowitz, M. & Stegun, I. A. (1972). Handbook of Mathematical Functions. Dover, New York. p. 932.

Another alternative is to use a quantile function to determine the limit value of a state such that the probability of that variable being less than or equal to the limit value equals a calibratable threshold probability.

Figure 7B:
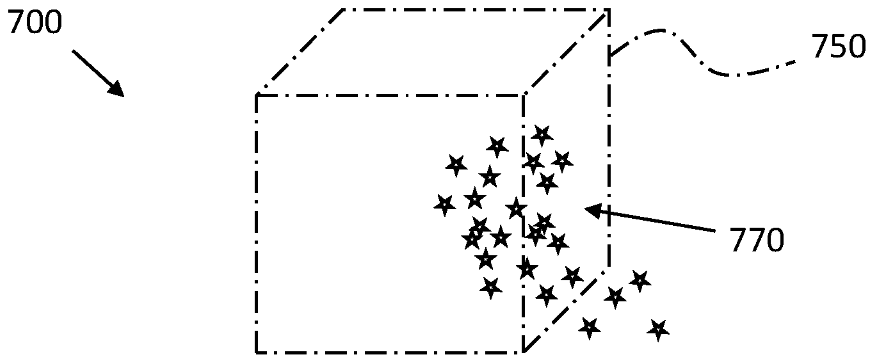

FIG. 7B illustrates another example 760 of how the future vehicle state can be estimated, and also how the associated future vehicle state uncertainty can be determined. This example is based on a particle filter implementation, where a large number of particles are used to estimate the vehicle state. Each particle 770 will be realized and updated using a different sensor error and motion prediction error realization, which means that the particles will become spread out over time. Particle filters are generally known and will therefore not be discussed in more detail herein. The uncertainty in the estimated future vehicle state is given by the spread of the particles. The particle swarm can be compared to the vehicle control envelope by, e.g., counting the number of particles located outside of a bounding polytope which defines the vehicle control envelope. If enough particles are outside of this bounding polytope, then the envelope is considered breached, and countermeasures are taken to bring the vehicle back under control.

Figure 9:
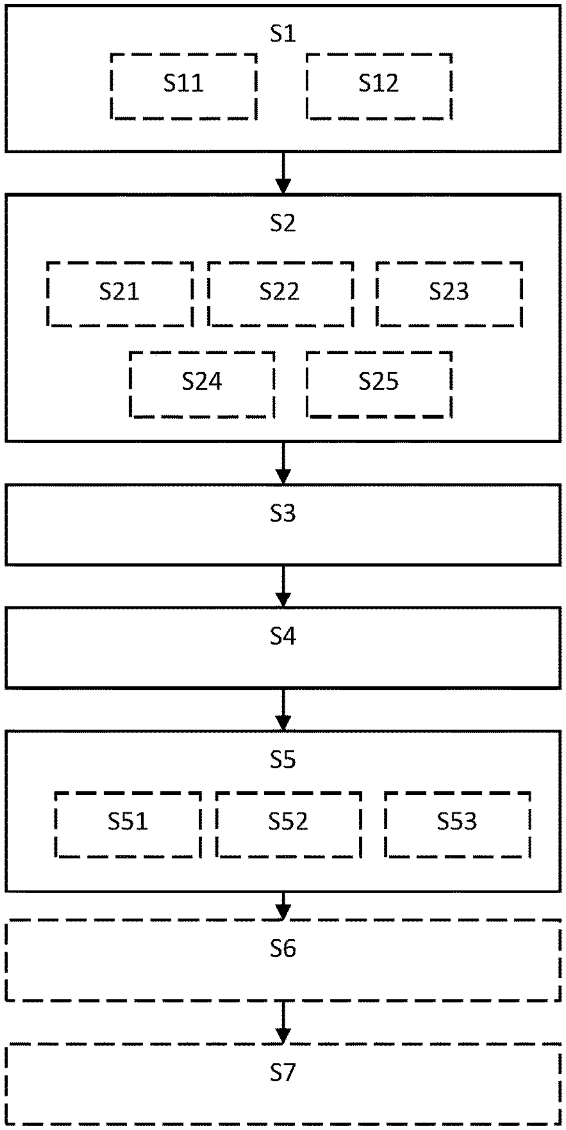
FIG. 9 is a flow chart illustrating methods.

FIG. 9 is a flow chart which exemplifies the above discussed techniques. FIG. 9 shows a method for controlling motion of a heavy-duty vehicle, such as the vehicle 100 discussed above in connection to FIG. 1 or some other type of heavy-duty vehicle. The heavy-duty vehicle may comprise any number of vehicle units. The vehicle may be a rigid truck, a semi-trailer, or even a multi-trailer vehicle comprising one or more dolly vehicle units.

The method comprises estimating S1 a current vehicle state $s_{t0}$ (exemplified by s(t0) in, e.g., FIG. 7A). The vehicle state comprises at least velocity $v_{t0}$ and acceleration $a_{t0}$. Both the velocity and the acceleration may be two or three-dimensional vectors also indicating the direction of the velocity or the acceleration in the reference frame of the vehicle unit. The vehicle state often comprises many more parameters than just velocity and acceleration. For instance, yaw moments, wheel slip, steering angles, lateral and/or longitudinal wheel force, vehicle component temperatures, and the like may also be comprised in the vehicle state. Normally, vehicle state is estimated for each unit in a combination vehicle, i.e., the tractor is associated with one state, and the trailer is associated with another state. The two states are of course linked since there is a mechanical link between the two vehicle units.

The estimated current state is associated with a current state uncertainty. This state uncertainty may be described using a probability function, such as a probability density function (PDF), a cumulative density function (CDF), a likelihood function, or some other function indicative of the level of uncertainty. A simple value from, say 1 to 256 can also be used to indicate uncertainty, where 256 means high uncertainty and 1 means very high certainty, i.e., trust in the estimated state value. It is appreciated that the different parameters in the vehicle state may have different uncertainty values over time. For instance, the velocity may be estimated with high certainty while lateral acceleration may be less certain. The vehicle state can be viewed as a vector, and the uncertainty visualized by a multi-dimensional uncertainty ellipse, as in the example of FIG. 7A.

According to some aspects, the method comprises determining S12 the current state uncertainty based on a measurement uncertainty associated with one or more sensor input signals. For instance, the VUCs 130, 140 may have stored models for each sensor which provide a current sensor reliability value. A radar sensor may, for instance, be able to estimate range to an object with high accuracy but be less accurate in estimating angle. Thus, if a state parameter relies on radar information, then the accuracy may vary depending on the relative positions of the vehicle unit and the target object used to determine, e.g., vehicle speed and/or vehicle acceleration. Wheel speed sensors may not be so reliable when it comes to determining vehicle unit speed over ground during periods of applied torque, due to the wheel slip generated by the applied torque.

The methods and techniques discussed herein are most advantageously used together with control strategies involving sending wheel slip or wheel speed requests to the different MSDs, instead of torque requests. The MSDs are then able to generate a stable longitudinal force by controlling wheel slip with high bandwidth control loop. Thus, according to some aspects, the method comprises controlling S7 the vehicle 100 by requesting wheel slip values and/or wheel speed values from one or more MSDs of the vehicle 100.

The method also comprises estimating S2 a future vehicle state $s_{t1}$ (exemplified by s(t1) in FIG. 7A) based on the current vehicle state $s_{t0}$, and on a predictive motion model of the vehicle 100, wherein the future vehicle state $s_{t1}$ is associated with a future vehicle state uncertainty. Estimation of the future vehicle state can be implemented in a number of different ways. Examples including Kalman filter extrapolators and particle filters were discussed above. Gaussian mixture models may also be used with advantage. Motion prediction is a relatively well studied field an much literature is available on the topic. Thus, motion prediction per se will not be discussed in more detail herein.

Having estimated what the vehicle state will be in the near future, and its uncertainty, the method then sets out to determine if this future vehicle state is associated with an unacceptable level of risk, as illustrated in FIG. 4, or if the future vehicle state is within the safe operational design domain of the vehicle.

Optionally, the method comprises determining S21 the future state uncertainty based on an uncertainty associated with the predictive motion model of the vehicle 100. Most predictive motion models suitable for use with heavy-duty vehicles also output a reliability measure associated with the prediction. For instance, if a Kalman filter extrapolator is used to predict a future vehicle state, then the covariance matrix of the filter gives an idea of the model uncertainty. A particle filter predictor provides a natural measure of uncertainty in the spread of the particles. A joint of total uncertainty can be obtained from combining the uncertainty of the current vehicle state estimate and the motion prediction. If the initial vehicle state estimate is not so good, then the future vehicle state estimate will of course also suffer from inaccuracies, and vice versa. The method may also comprise estimating S24 the future vehicle state $s_{t1}$ or states at least in part as a Gaussian mixture model, GMM, probability density function.

As mentioned above, the vehicle 100 may be an articulated vehicle comprising a plurality of vehicle units 110, 120. In this case the method may comprise estimating S23 the respective future vehicle state $s_{t1}$ separately for each vehicle unit in the plurality of vehicle units 110, 120.

The method may also comprise determining S22 the future state uncertainty based on a bounded behavior associated with one or more motion support devices (MSDs). The method may, for instance, comprise setting a wheel slip limit on an operation of at least one vehicle torque device, and then obtaining a model associated with vehicle dynamics based on the set wheel slip limit. This way the model will be automatically validated since it can be assumed that the vehicle torque device (brake or propulsion device) will never exceed the configured wheel slip. Thus, the disclosed methods allow for using explicit models of vehicle dynamics to analyze the behavior of the vehicle during, e.g., an emergency maneuver. This is an advantage compared to models that are implicitly given by data since explicit models i) can be more easily analyzed by humans, and ii) allows for analyzing the behavior during an emergency maneuver using well-established formal methods from control theory. Consequently, the methods disclosed herein provide a more efficient usage of data when, e.g., the performance of an emergency maneuver is validated. Another beneficial effect associated with the herein disclosed methods is that the capability of being able to generate lateral forces during, e.g., an emergency maneuver is maintained due to the set limits on wheel slip. This reduces the necessary model uncertainty margins and therefore increases the vehicle ODD, which is an advantage.

With reference to FIGS. 8A-C, a measure of maximum allowable slip for an MSD can be determined as follows. Suppose a vehicle is associated with some operational design domain (ODD); For example, there may be a limit on velocity $v_x$ and road curvature Q or some other type of limit on maneuvering by the vehicle. The maximum lateral acceleration $a_{y,max}$ can then be determined as $$a_{y,max} = \frac{v_{x,max}^2}{Q}$$

where $v_{x,max}$ is a configured speed limit or speed capability of the vehicle. This lateral acceleration results in a lateral tyre force $F_y$ (depending on vehicle mass properties). This lateral tyre force can be used to find a maximum allowable slip limit 340. When studying, e.g., the vehicle cornering response, it is useful to combine the effects of all tyres on the axle into one virtual tyre. This assumption, referred to as the one-track model (or single-track model or bicycle model), facilitates understanding but can also capture important phenomena. The simplification of vehicle dynamical models into a single track model is well known and will not be discussed herein in more detail. Lateral wheel slip, $s_{yw}$, can be defined as $$s_{yw} = \frac{v_y}{v_x}$$

where $v_y$ and $v_x$ denote lateral and longitudinal velocity, respectively. The lateral tyre slip, $s_{yt}$, can be defined as $$s_{yt} = \frac{v_y}{|R\omega|}$$

where $v_y$ denotes the tyre translational velocity. If there is no longitudinal slip, then $v_x$=Rω and $s_{yt}$=$s_{yw}$. The wheel slip angle, α, can be defined as
$s_{yw}$=tan α. For small lateral tyre slips, as shown in FIG. 8B, the lateral tyre force, $F_y$, may be modelled as $$F_y = -C_y s_{yt}$$

where $C_y$ is a constant. This constant is sometimes referred to as cornering stiffness and depends on, e.g., wheel slip and on the normal force $F_z$. The lateral force $F_y$ can never exceed $F_z$*μ, where μ is a friction coefficient. The axle load on the drive axle or drive axles is especially important when it comes to determining how the vehicle can be accelerated. Low axle load on the drive axle often means that the wheels slip more easily.

The cornering stiffness of a vehicle is an example of a vehicle model which can be validated by setting limits on wheel slip. This is at least partly because models of cornering stiffness change substantially when the wheel enters a severe slip condition, while more simple models can be assumed valid for low slip values, i.e., for small lateral tyre slips. It is also noted that, by imposing a limit on allowable wheel slip, simplified models of vehicle properties valid for small wheel slip can be used. This simplifies predicting vehicle motion.

The method further comprises defining S3 a vehicle control envelope representing an operational limit of the vehicle. The vehicle control envelope defines a range of vehicle states, such as a polytope which bounds the values in a state vector.

By comparing S4 the estimated future vehicle state $s_{t1}$, and the associated future vehicle state uncertainty, to the vehicle control envelope, it can be ascertained if the vehicle risks ending up in a hazardous situation or unpredictable situation if, e.g., the current driver input command is allowed to pass through to the motion support device. If a probability that the future vehicle state $s_{t1}$ breaches the control envelope is above a configured threshold value, the vehicle control unit limits S5 a motion capability of the vehicle 100. This limitation may, e.g., be implemented simply by sending a report to higher layer control functions about the new capabilities of the vehicle, or of a certain vehicle unit in a combination vehicle. The limitation can also be implemented by directly sending this capability limitation to the control allocator. A multi-stage intervention mechanism can be implemented, first by sending capability limitation only to TSM when things are getting risky, but not too dangerous and then by sending capability limitations to control allocators when things are getting really dangerous.

According to aspects, the method comprises estimating S25 the future vehicle state $s_{t1}$ or states between 0.5 to 1.5 seconds ahead in time from the current vehicle state $s_{t0}$. This time horizon has been found possible to support using current vehicle sensor technology and predictive motion models. Of course, both longer and shorter time horizons can also be used. Generally, since the uncertainty of the future vehicle state is taken into account, any time horizon can be used. If a too long time horizon is used, then the uncertainty will go to infinity, indicating that there is no accurate information in the estimation, i.e., there is no information related to the future vehicle state so far ahead in time.

Different actions may be triggered when the future vehicle state risks breaching the control envelope. For instance, the method may comprise any of; limiting S51 a maximum velocity capability of the vehicle 100, limiting S52 a maximum acceleration capability of the vehicle 100, limiting S53 a maximum steering angle capability of the vehicle 100, limiting S54 a maximum yaw moment capability of the vehicle 100, limiting S55 a capability of a specific vehicle axle, and limiting S56 a capability of a specific vehicle wheel.

The methods disclosed herein may also comprise performing S6 a corrective action by the vehicle in response to the probability that the future vehicle state $s_{t1}$ breaching the control envelope being above a configured threshold value. This corrective action may for instance comprise reducing a desired global force communicated to an MSD coordination module.

Figure 10:
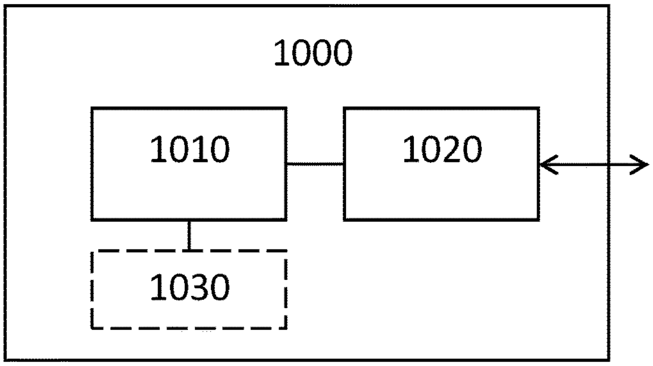
FIG. 10 schematically illustrates a sensor unit and/or a control unit.

FIG. 10 schematically illustrates, in terms of a number of functional units, the components of a control unit 1000 according to embodiments of the discussions herein, such as any of the VUCs 130, 140. This control unit 1000 may be comprised in the articulated vehicle 1. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a storage medium 1030. The processing circuitry 1010 may further be provided as at least one application specific integrated circuit ASIC, or field programmable gate array FPGA.

Particularly, the processing circuitry 1010 is configured to cause the control unit 1000 to perform a set of operations, or steps, such as the methods discussed in connection to FIG. 9. For example, the storage medium 1030 may store the set of operations, and the processing circuitry 1010 may be configured to retrieve the set of operations from the storage medium 1030 to cause the control unit 1000 to perform the set of operations. The set of operations may be provided as a set of executable instructions. Thus, the processing circuitry 1010 is thereby arranged to execute methods as herein disclosed.

The storage medium 1030 may also comprise persistent storage, which, for example, can be any single one or combination of magnetic memory, optical memory, solid state memory or even remotely mounted memory.

The control unit 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 1000, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

Figure 11:
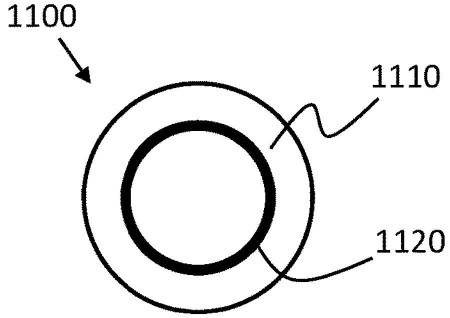
FIG. 11 shows an example computer program product.

FIG. 11 illustrates a computer readable medium 1110 carrying a computer program comprising program code means 1120 for performing the methods illustrated in FIG. 9, when said program product is run on a computer. The computer readable medium and the code means may together form a computer program product 1100.

The invention claimed is:

1. A computer-implemented method for controlling motion of a heavy-duty vehicle, the method comprising estimating a current vehicle state comprising at least velocity and acceleration, wherein the estimated current state is associated with a current state uncertainty, determining the current state uncertainty based on a measurement uncertainty associated with one or more sensor input signals, estimating a future vehicle state based on the current vehicle state, and on a predictive motion model of the vehicle, wherein the future vehicle state is associated with a future vehicle state uncertainty, wherein the future vehicle state uncertainty is based on an uncertainty associated with the predictive model such that the future vehicle state uncertainty is increased when the vehicle enters into a current state for which the predictive motion model has decreased accuracy, defining a vehicle control envelope representing an operational limit of the vehicle, wherein the vehicle control envelope defines a range of vehicle states, comparing the estimated future vehicle state, and the associated future vehicle state uncertainty, to the vehicle control envelope, and, when a probability that the future vehicle state breaches the control envelope is above a configured threshold value, controlling the motion of the heavy-duty vehicle by limiting a motion capability of the vehicle.

2. The method according to claim 1, wherein the vehicle state also comprises any of wheel slip, axle side slip, lateral and/or longitudinal wheel force, and yaw motion.

3. The method according to claim 1, comprising determining the future state uncertainty based on an uncertainty associated with the predictive motion model of the vehicle.

4. The method according to claim 1, comprising determining the future state uncertainty based on a bounded behavior associated with one or more motion support devices.

5. The method according to claim 1, wherein the vehicle is an articulated vehicle comprising a plurality of vehicle units, where the method further comprises estimating the respective future vehicle state separately for each vehicle unit in the plurality of vehicle units.

6. The method according to claim 1, comprising estimating the future vehicle state or states at least in part as a Gaussian mixture model probability density function.

7. The method according to claim 1, comprising estimating the future vehicle state or states between 0.5 to 1.5 seconds ahead in time from the current vehicle state.

8. The method according to claim 1, comprising limiting a maximum velocity capability of the vehicle.

9. The method according to claim 1, comprising limiting a maximum acceleration capability of the vehicle.

10. The method according to claim 1, comprising limiting a maximum steering angle capability of the vehicle.

11. The method according to claim 1, comprising limiting a maximum yaw moment capability of the vehicle.

12. The method according to claim 1, comprising limiting a capability of a specific vehicle axle.

13. The method according to claim 1, comprising limiting a capability of a specific vehicle wheel.

14. The method according to claim 1, comprising performing a corrective action by the vehicle in response to the probability that the future vehicle state breaching the control envelope being above a configured threshold value, wherein the corrective action comprises reducing a desired global force communicated to an motion support device coordination module.

15. The method according to claim 1, comprising controlling the vehicle by requesting wheel slip values and/or wheel speed values from one or more motion support devices of the vehicle.

16. A non-transitory computer readable medium carrying a computer program comprising program code for performing the steps of claim 1 when said program code is run on a computer or on processing circuitry of a control unit.

17. A control unit for determining an allowable vehicle state space of an articulated vehicle, the control unit being configured to perform the steps of the method according to claim 1.

18. A vehicle comprising a control unit according to claim 17.

* * * * *